United States Patent
Arai et al.

(10) Patent No.: US 12,095,687 B2
(45) Date of Patent: Sep. 17, 2024

(54) TRANSMISSION CONTROL METHOD AND PROGRAM

(71) Applicant: NIPPON TELEGRAPH AND TELEPHONE CORPORATION, Tokyo (JP)

(72) Inventors: Kenichi Arai, Tokyo (JP); Takahiko Yoshida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 336 days.

(21) Appl. No.: 17/620,629

(22) PCT Filed: Jun. 20, 2019

(86) PCT No.: PCT/JP2019/024539
§ 371 (c)(1),
(2) Date: Dec. 17, 2021

(87) PCT Pub. No.: WO2020/255342
PCT Pub. Date: Dec. 24, 2020

(65) Prior Publication Data
US 2022/0247527 A1    Aug. 4, 2022

(51) Int. Cl.
*H04L 5/00* (2006.01)
*H04L 45/64* (2022.01)
*H04L 69/16* (2022.01)

(52) U.S. Cl.
CPC ............ *H04L 5/0044* (2013.01); *H04L 45/64* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 10,361,859 B2* | 7/2019 | Clark | H04L 67/104 |
| 10,367,811 B2* | 7/2019 | Clark | H04W 4/70 |
| 10,374,803 B2* | 8/2019 | Clark | H04L 63/105 |
| 10,397,186 B2* | 8/2019 | Clark | H04L 63/0272 |
| 10,735,476 B1* | 8/2020 | VanderKnyff | H04L 69/14 |
| 2011/0321145 A1 | 12/2011 | Shimotono | |
| 2018/0294973 A1* | 10/2018 | Miller | H04L 69/22 |
| 2019/0109822 A1* | 4/2019 | Clark | H04L 63/145 |
| 2020/0252411 A1* | 8/2020 | Inforzato | H04L 63/1425 |

FOREIGN PATENT DOCUMENTS

| | | |
|---|---|---|
| JP | 2008176725 A | 7/2008 |
| JP | 2010157068 A | 7/2010 |
| JP | 201214278 A | 1/2012 |
| WO | WO-2009093308 A1 * | 7/2009 ......... H04L 12/4633 |

OTHER PUBLICATIONS

"OSI reference model" (2019) Wikipedia [online] Accessed on Mar. 29, 2019, website: https://ja.wikipedia.org/wiki/OSI参照モデル.

* cited by examiner

*Primary Examiner* — Christopher M Crutchfield

(57) ABSTRACT

A transmission control method is a transmission control method for a transmission device based on the OSI reference model and includes a generation step S101 of generating a payload at a higher layer and a communication processing process step S103 of executing or stopping a communication processing process on the payload at a lower layer, on the basis of input control information.

17 Claims, 7 Drawing Sheets

TRANSMISSION CONTROL METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/024539, filed on 20 Jun. 2019, the disclosure of which is hereby incorporated herein by reference in its entirety.

TECHNICAL FIELD

The present invention relates to a transmission control method and a program.

BACKGROUND ART

The OSI (Open System Interconnection) reference model, which has been developed by the International Organization for Standardization, is known as a unified standard for implementation of data communication between different models. The OSI reference model is a model in which communication functions of pieces of communication equipment are hierarchically divided into seven layers, the seventh layer (application layer), the sixth layer (presentation layer), the fifth layer (session layer), the fourth layer (transport layer), the third layer (network layer), the second layer (data link layer), and the first layer (physical layer) (see, for example, Non-Patent Literature 1).

Along with the recent popularization of IoT (Internet of Things) systems, phenomena where IoT devices have been infected with malware are increasing. Since an IoT device has a CPU (Central Processing Unit) and memory and has applications installed thereon, the IoT device is highly likely to be infected with malware. Under the present circumstances, however, IoT devices are not appropriately operated and monitored, unlike enterprise systems. For this reason, even if an IoT device is infected with malware, a manager of the IoT device is often unaware of the infection.

An IoT device is vulnerable to falsification due to takeover by a malicious third party. An IoT device may be installed in the open air, unlike enterprise systems. In this case, it is easy for a malicious third party to open the IoT device, directly connect a PC (personal computer) or the like to the IoT device, and physically take over the IoT device.

CITATION LIST

Non-Patent Literature

Non-Patent Literature 1: "OSI sansho moderu" (the OSI reference model), [online], [retrieved on Jun. 14, 2019], from the Internet: <https://ja.wikipedia.org/wiki/OSI sansho moderu> (the OSI reference model)

SUMMARY OF THE INVENTION

Technical Problem

A method for arbitrarily controlling execution or stoppage of data transmission to external equipment (e.g., a server) in a transmission device (e.g., an IoT device) based on the OSI reference model is not known.

For the above-described reason, when a communication unnecessary for a receiving side is transmitted from a transmitting side, the receiving side manually or automatically discards the received unnecessary communication. Especially when a communication unnecessary for the receiving side is transmitted from, e.g., an IoT device infected with malware, an IoT device physically taken over by a malicious third party, or an IoT device missing due to a disaster or the like, the receiving side manually or automatically discards the received unnecessary communication.

The only way to stop a communication unnecessary for a receiving side which is transmitted from an IoT device infected with malware or an IoT device physically taken over by a malicious third party is a physical solution, such as visiting a site where the IoT device installed and forcibly stopping communication of the IoT device or eliminating the IoT device.

When a communication unnecessary for the receiving side is transmitted from an IoT device missing due to a disaster or the like, the receiving side cannot help receiving the communication unnecessary for the receiving side until the location of the missing IoT device is identified, and the IoT device is eliminated.

An object of the present invention made in view of the above-described circumstances is to provide a transmission control method and a program capable of arbitrarily controlling execution or stoppage of data transmission to external equipment in a transmission device based on the OSI reference model.

Means for Solving the Problem

To solve the above-described problem, a transmission control method according to the present invention is a transmission control method for a transmission device based on an OSI reference model and includes a generation step of generating a payload at a higher layer and a communication processing process step of executing or stopping a communication processing process on the payload at a lower layer on the basis of input control information.

To solve the above-described problem, a program according to the present invention causes a computer to execute the transmission control method.

Effects of the Invention

According to the present invention, it is possible to arbitrarily control execution or stoppage of data transmission to external equipment in a transmission device based on the OSI reference model.

DESCRIPTION OF EMBODIMENTS

Embodiments of the present invention will be described below in detail with reference to the drawings.

First Embodiment

[Transmission Device]

Figure 1:
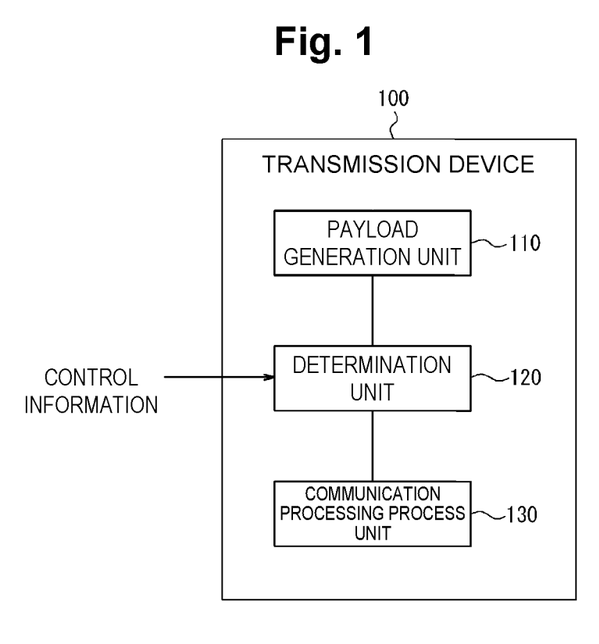
FIG. 1 is a block diagram showing an example of a configuration of a transmission device according to a first embodiment of the present invention.
Figure 2:
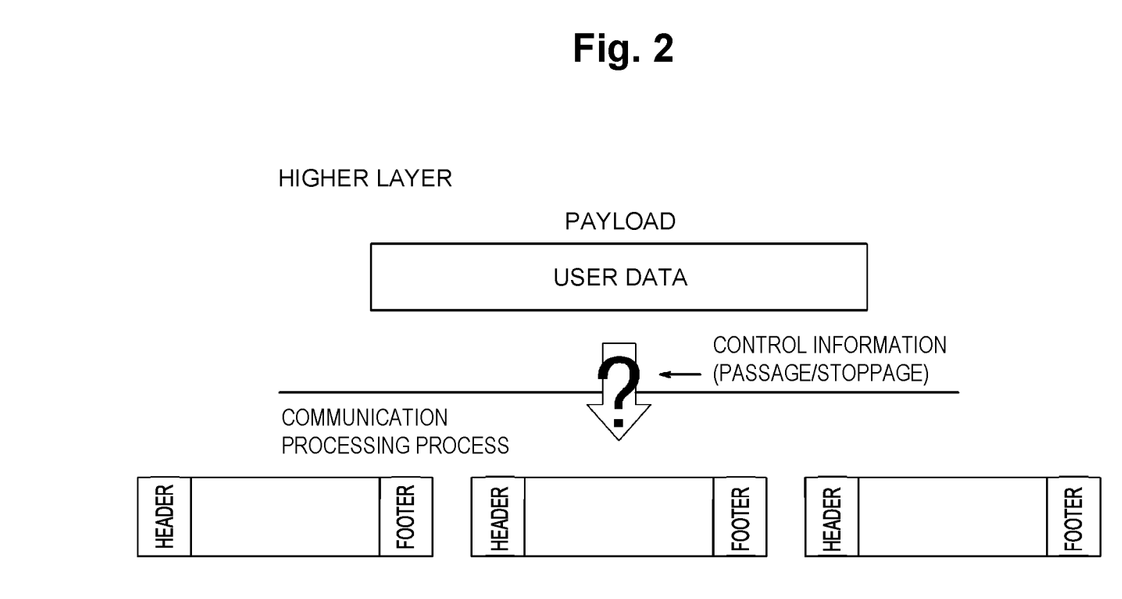
FIG. 2 is a chart showing an example of a conceptual diagram of the transmission device according to the first embodiment of the present invention.

A transmission device 100 according to a first embodiment will be described with reference to FIGS. 1 and 2. FIG. 1 is a diagram showing an example of a configuration of the transmission device 100 according to the first embodiment. FIG. 2 is a chart showing an example of a conceptual diagram of the transmission device 100 according to the first embodiment.

As shown in FIG. 1, the transmission device 100 includes a payload generation unit 110, a determination unit 120, and a communication processing process unit 130. As long as the transmission device 100 is a device based on the OSI reference model, the configuration of the transmission device 100 is not particularly limited. The transmission device 100 may be, for example, a personal computer, a smartphone, or a tablet terminal.

The payload generation unit 110 generates a payload which contains user data. The payload is generated at a higher layer (e.g., the application layer). The payload generation unit 110 outputs the generated payload to the determination unit 120.

The determination unit 120 determines whether to allow the payload to pass from the higher layer to a lower layer (e.g., the presentation layer), on the basis of input control information (see FIG. 2). The control information is information for controlling execution or stoppage of data transmission to external equipment in the transmission device 100. For example, when control information indicating passage is input to the determination unit 120, the payload passes from the higher layer to the lower layer, and a communication processing process on the payload is executed at the lower layer. That is, the transmission device 100 is controlled so as to execute data transmission to the external equipment and execute communication between the transmission device 100 and the external equipment. For example, when control information indicating stoppage is input to the determination unit 120, the payload does not pass from the higher layer to the lower layer, and the communication processing process on the payload is not executed at the lower layer. That is, the transmission device 100 is controlled so as to stop data transmission to the external equipment and stop communication between the transmission device 100 and the external equipment.

Control information (passage or stoppage) may be generated inside the transmission device 100 and input to the determination unit 120 or may be input from outside the transmission device 100 to the determination unit 120. For example, the determination unit 120 may generate control information or control information may be generated by the external equipment and be input from the external equipment to the determination unit 120.

If the determination unit 120 determines to allow a payload to pass from the higher layer to the lower layer, on the basis of input control information (passage), the payload is allowed to pass from the higher layer to the lower layer. In this case, the communication processing process on the payload is executed at the lower layer. On the other hand, if the determination unit 120 determines not to allow the payload to pass from the higher layer to the lower layer, on the basis of input control information (stoppage), the payload is stopped at the higher layer. In this case, the communication processing process on the payload is not executed at the lower layer.

The communication processing process unit 130 executes or stops the communication processing process on the payload at the lower layer on the basis of the control information input to the transmission device 100. That is, the communication processing process unit 130 executes or stops the communication processing process on the payload at the lower layer on the basis of whether the payload has passed from the higher layer to the lower layer or has not passed from the higher layer to the lower layer.

If the payload has passed from the higher layer to the lower layer, the communication processing process unit 130 executes the communication processing process on the payload at the lower layer. In this case, the transmission device 100 performs data transmission to the external equipment. On the other hand, if the payload has not passed from the higher layer to the lower layer, the communication processing process unit 130 stops the communication processing process on the payload at the lower layer. In this case, the transmission device 100 does not perform data transmission to the external equipment.

When the communication processing process unit 130 is to execute the communication processing process on a payload at the lower layer, the communication processing process unit 130 executes the communication processing process on the payload in the order of the presentation layer, the session layer, the transport layer, the network layer, the data link layer, the physical layer. The payload is processed in order at the layers (the sixth to first layers), thereby adding headers and footers required for communication between the transmission device 100 and the external equipment.

In the transmission device 100 according to the first embodiment, the determination unit 120 provided between the payload generation unit 110 and the communication processing process unit 130 determines whether to allow a payload to pass from the higher layer to the lower layer, on the basis of input control information, and the communication processing process unit 130 executes or stops the communication processing process on the payload at the lower layer, on the basis of the determination by the determination unit 120. That is, in a transmission device based on the OSI reference model, the determination unit 120 can control execution or stoppage of the communication processing process on the basis of input control information and arbitrarily control execution or stoppage of data transmission to the external equipment without tampering with the existing OSI reference model.

[Transmission Control Method]

Figure 3:
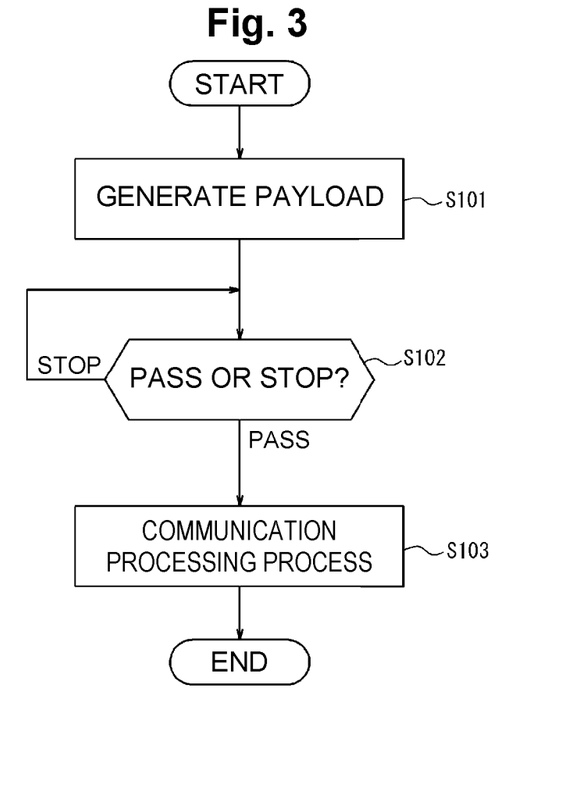
FIG. 3 is a flowchart showing an example of a transmission control method according to the first embodiment of the present invention.

A transmission control method according to the first embodiment will be described with reference to FIG. 3. FIG. 3 is a flowchart showing an example of the transmission control method.

In step S101, the payload generation unit 110 generates a payload which contains user data.

In step S102, the determination unit 120 determines whether to allow the payload to pass from the higher layer to the lower layer, on the basis of input control information. If the determination unit 120 determines to allow the payload to pass from the higher layer to the lower layer, on the basis of control information indicating passage, a process in step S103 is performed. If the determination unit 120 determines not to allow the payload to pass from the higher layer to the lower layer, on the basis of control information indicating stoppage, the process in step S102 is performed.

In step S103, the communication processing process unit 130 executes the communication processing process that adds headers and footers required for communication between the transmission device 100 and the external equipment to the payload.

The transmission control method according to the first embodiment makes it possible to arbitrarily control execution or stoppage of data transmission to the external equipment in a transmission device based on the OSI reference model.

Application of the transmission control method according to the first embodiment to, for example, an IoT device infected with malware, an IoT device physically taken over by a malicious third party, and an IoT device missing due to a disaster or the like allows a manager of the external equipment to solve a conventional problem. The conventional problem is that, if the external equipment receives unnecessary data, the unnecessary data needs to be automatically or manually discarded.

Also, application of the transmission control method according to the first embodiment to an IoT device infected with malware and an IoT device physically taken over by a malicious third party allows the manager of the external equipment to solve a conventional problem. The conventional problem is that, if the external equipment receives unnecessary data, the manager of the external equipment needs to visit a site where such devices are installed and forcibly stop communication of the devices or eliminate the devices.

Additionally, application of the transmission control method according to the first embodiment to an IoT device missing due to a disaster or the like allows the manager of the external equipment to solve a conventional problem. The conventional problem is that, if the external equipment receives unnecessary data, the manager of the external equipment needs to identify and eliminate such devices.

Second Embodiment

[Communication System]

Figure 4:
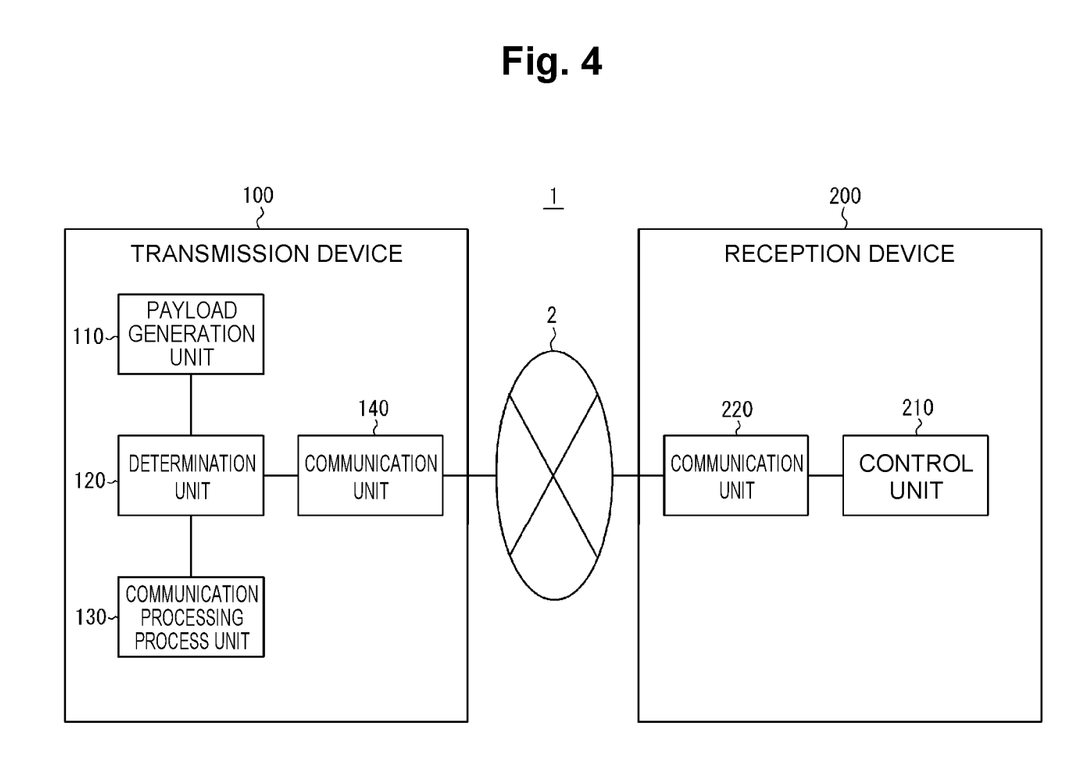
FIG. 4 is a block diagram showing an example of a configuration of a communication system according to a second embodiment of the present invention.

A communication system 1 according to a second embodiment will be described with reference to FIG. 4. FIG. 4 is a diagram showing an example of a configuration of a communication system 1 according to the second embodiment.

As shown in FIG. 4, the communication system 1 includes a transmission device 100 and a reception device 200. The transmission device 100 includes a payload generation unit 110, a determination unit 120, a communication processing process unit 130, and a communication unit 140. The reception device 200 includes a control unit 210 and a communication unit 220. The transmission device 100 and the reception device 200 are connected to each other by a network 2.

As long as the transmission device 100 is a device based on the OSI reference model, a configuration thereof is not particularly limited. The transmission device 100 may be, for example, a personal computer, a smartphone, or a tablet terminal. As long as the reception device 200 is a device based on the OSI reference model, a configuration thereof is not particularly limited. The reception device 200 may be, for example, a server. Note that a transmission device according to the second embodiment is different from a transmission device according to the first embodiment in that control information may be internally or externally input to the transmission device according to the first embodiment whereas control information is input from a reception device to the transmission device according to the second embodiment. Since the other components are the same, a repetitive description thereof may be omitted.

The payload generation unit 110 generates a payload which contains user data. The payload is generated at a higher layer (e.g., the application layer). The payload generation unit 110 outputs the generated payload to the determination unit 120.

The determination unit 120 determines whether to allow the payload to pass from the higher layer to a lower layer (e.g., the presentation layer), on the basis of control information which is received from the communication unit 220 of the reception device 200 via the network 2 by the communication unit 140 of the transmission device 100 and is input from the communication unit 140. The control information is information for controlling execution or stoppage of data transmission to the reception device 200 in the transmission device 100. For example, when control information indicating that i=0 (passage) is input to the determination unit 120, the payload passes from the higher layer to the lower layer, and a communication processing process on the payload is executed at the lower layer. That is, the transmission device 100 is controlled so as to execute data transmission to the reception device 200 and execute communication between the transmission device 100 and the reception device 200. For example, when control information indicating that i=1 (stoppage) is input to the determination unit 120, the payload does not pass from the higher layer to the lower layer, and the communication processing process on the payload is not executed at the lower layer. That is, the transmission device 100 is controlled so as to stop data transmission to the reception device 200 and stop communication between the transmission device 100 and the reception device 200.

If the determination unit 120 determines to allow a payload to pass from the higher layer to the lower layer, on the basis of control information (i=0 (passage)) which is input from the communication unit 140, the payload is allowed to pass from the higher layer to the lower layer. In this case, the communication processing process on the payload is executed at the lower layer. On the other hand, if the determination unit 120 determines not to allow the payload to pass from the higher layer to the lower layer, on the basis of control information (i=1 (stoppage)) which is input from the communication unit 140, the payload is stopped at the higher layer. In this case, the communication processing process on the payload is not executed at the lower layer.

The communication processing process unit 130 executes or stops the communication processing process on the payload at the lower layer on the basis of the control information received from the communication unit 220 of the reception device 200 via the network 2 by the communication unit 140 of the transmission device 100. That is, the communication processing process unit 130 executes or stops the communication processing process on the payload at the lower layer on the basis of whether the payload has passed from the higher layer to the lower layer or has not passed from the higher layer to the lower layer.

If the payload has passed from the higher layer to the lower layer, the communication processing process unit 130 executes the communication processing process on the payload at the lower layer. In this case, the transmission device 100 performs data transmission to the reception device 200. On the other hand, if the payload has not passed from the higher layer to the lower layer, the communication processing process unit 130 stops the communication processing process on the payload at the lower layer. In this case, the transmission device 100 does not perform data transmission to the reception device 200.

The communication unit 140 communicates with the communication unit 220 of the reception device 200 via the network 2. The communication unit 140 receives, for example, various types of information, such as control information, from the communication unit 220 of the reception device 200 via the network 2. The communication unit 140 transmits, for example, various types of information, such as data after the communication processing process (a payload with added headers and footers) to the communication unit 220 of the reception device 200 via the network 2.

For example, when the communication unit 140 receives control information (i=0 (passage)) from the communication unit 220 of the reception device 200 via the network 2, the communication unit 140 outputs the control information (i=0 (passage)) to the determination unit 120. For example, when the communication unit 140 receives control information (i=1 (stoppage)) from the communication unit 220 of the reception device 200 via the network 2, the communication unit 140 outputs the control information (i=1 (stoppage)) to the determination unit 120.

The control unit 210 generates control information (i=0 (passage) or i=1 (stoppage)). The control unit 210 outputs the generated control information (i=0 (passage) or i=1 (stoppage)) to the communication unit 220. Generation of control information by the control unit 210 allows the reception device 200 to arbitrarily control execution or stoppage of communication between the transmission device 100 and the reception device 200.

For example, if the control unit 210 does not want to receive data from the transmission device 100, i.e., if the control unit 210 determines that data transmitted from the transmission device 100 is unnecessary data, the control unit 210 generates, as control information, i=1 (stoppage) and outputs the control information to the communication unit 220. The control information (i=1 (stoppage)) output to the communication unit 220 is transmitted to the communication unit 140 of the transmission device 100 via the network 2. The determination unit 120 determines to allow a payload to pass from the higher layer to the lower layer, on the basis of the control information (i=0 (passage)) input from the communication unit 140 of the transmission device 100.

For example, if the control unit 210 wants to receive data from the transmission device 100, i.e., if the control unit 210 determines that data transmitted from the transmission device 100 is not unnecessary data, the control unit 210 generates, as control information, i=0 (passage) and outputs the control information to the communication unit 220. The control information (i=0 (passage)) output to the communication unit 220 is transmitted to the communication unit 140 of the transmission device 100 via the network 2. The determination unit 120 determines not to allow a payload to pass from the higher layer to the lower layer, on the basis of the control information (i=0 (passage)) input from the communication unit 140 of the transmission device 100.

The communication unit 220 communicates with the communication unit 140 of the transmission device 100 via the network 2. The communication unit 220 transmits various types of information, such as control information (i=0 (passage) or i=1 (stoppage)), to the communication unit 140 of the transmission device 100 via the network 2. The communication unit 220 receives, for example, various types of information, such as data after the communication processing process (e.g., a payload with added headers and footers), from the communication unit 140 of the transmission device 100 via the network 2.

For example, when the communication unit 220 transmits control information (i=0 (passage)) which is input from the control unit 210 to the communication unit 140 of the transmission device 100 via the network 2, the communication processing process unit 130 executes the communication processing process on a payload at the lower layer. The communication unit 220 receives data after the communication processing process from the communication unit 140 of the transmission device 100 via the network 2. That is, if the communication processing process on a payload is executed at the lower layer, the transmission device 100 and the reception device 200 execute communication.

For example, when the communication unit 220 transmits control information (i=1 (stoppage)) which is input from the control unit 210 to the communication unit 140 of the transmission device 100 via the network 2, the communication processing process unit 130 stops the communication processing process on a payload at the lower layer. That is, if the communication processing process on a payload is stopped at the lower layer, the transmission device 100 and the reception device 200 stop communication.

The communication system 1 according to the second embodiment makes it possible to arbitrarily control, by the reception device 200, execution or stoppage of data transmission to the reception device 200 in the transmission device 100 based on the OSI reference model. The communication system 1 according to the second embodiment also makes it possible to arbitrarily control, by the reception device 200, execution or stoppage of communication between the transmission device 100 and the reception device 200.

[Transmission Control Method]

Figure 5:
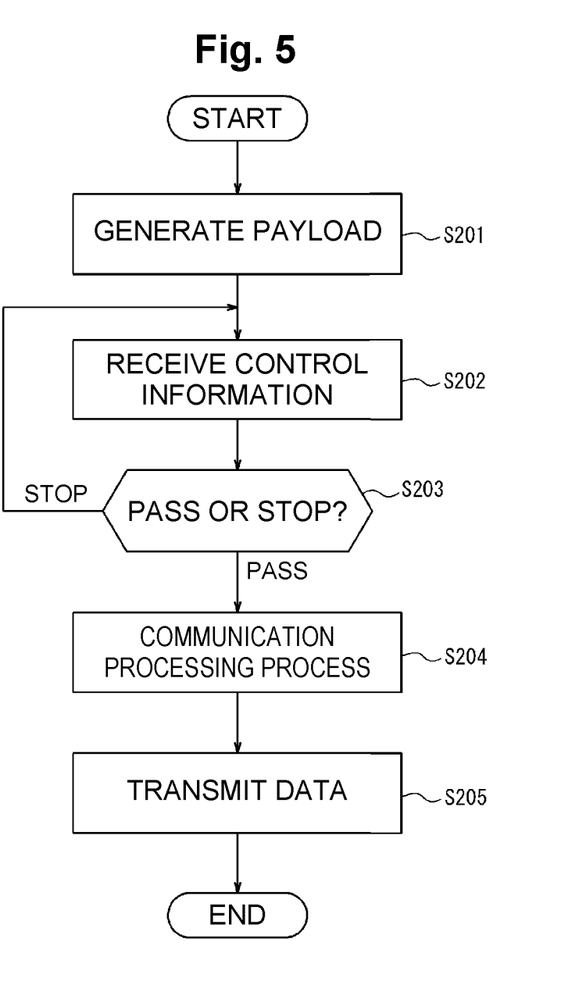
FIG. 5 is a flowchart showing an example of a transmission control method according to the second embodiment of the present invention.

A transmission control method according to the second embodiment will be described with reference to FIG. 5. FIG. 5 is a flowchart showing an example of the transmission control method.

In step S201, the transmission device 100 generates a payload which contains user data.

In step S202, the transmission device 100 receives control information (i=0 (passage) or i=1 (stoppage)) from the reception device 200 via the network 2.

In step S203, the transmission device 100 determines whether to allow the payload to pass from the higher layer to the lower layer, on the basis of the control information input from the reception device 200. If the transmission device 100 determines to allow the payload to pass from the higher layer to the lower layer, on the basis of control information indicating that i=0 (passage), a process in step S204 is performed. If the transmission device 100 determines not to allow the payload to pass from the higher layer to the lower layer, on the basis of control information indicating that i=1 (stoppage), the process in step S202 is performed.

In step S204, the transmission device 100 executes the communication processing process that adds headers and footers required for communication between the transmission device 100 and the reception device 200 to the payload.

In step S205, the transmission device 100 transmits data after the communication processing process to the reception device 200 via the network 2. Note that, if the transmission device 100 does not execute the communication processing process, the transmission device 100 and the reception device 200 stop communication.

The transmission control method according to the second embodiment makes it possible to arbitrarily control, by the reception device 200, execution or stoppage of data transmission to the reception device 200 in a transmission device based on the OSI reference model. The transmission control method according to the second embodiment also makes it possible to arbitrarily control, by the reception device 200, execution or stoppage of communication between the transmission device 100 and the reception device 200.

Application of the transmission control method according to the second embodiment to, for example, an IoT device infected with malware, an IoT device physically taken over by a malicious third party, and an IoT device missing due to a disaster or the like allows a manager of the reception device 200 to solve a conventional problem. The conventional problem is that, if the reception device 200 receives unnecessary data, the unnecessary data needs to be automatically or manually discarded.

Also, application of the transmission control method according to the second embodiment to an IoT device infected with malware and an IoT device physically taken over by a malicious third party allows the manager of the reception device 200 to solve a conventional problem. The conventional problem is that, if the reception device 200 receives unnecessary data, the manager of the reception device 200 needs to visit a site where such devices are installed and forcibly stop communication of the devices or eliminate the devices.

Additionally, application of the transmission control method according to the second embodiment to an IoT device missing due to a disaster or the like allows the manager of the reception device 200 to solve a conventional problem. The conventional problem is that, if the reception device 200 receives unnecessary data, the manager of the reception device 200 needs to identify and eliminate such devices.

Third Embodiment

Figure 6:
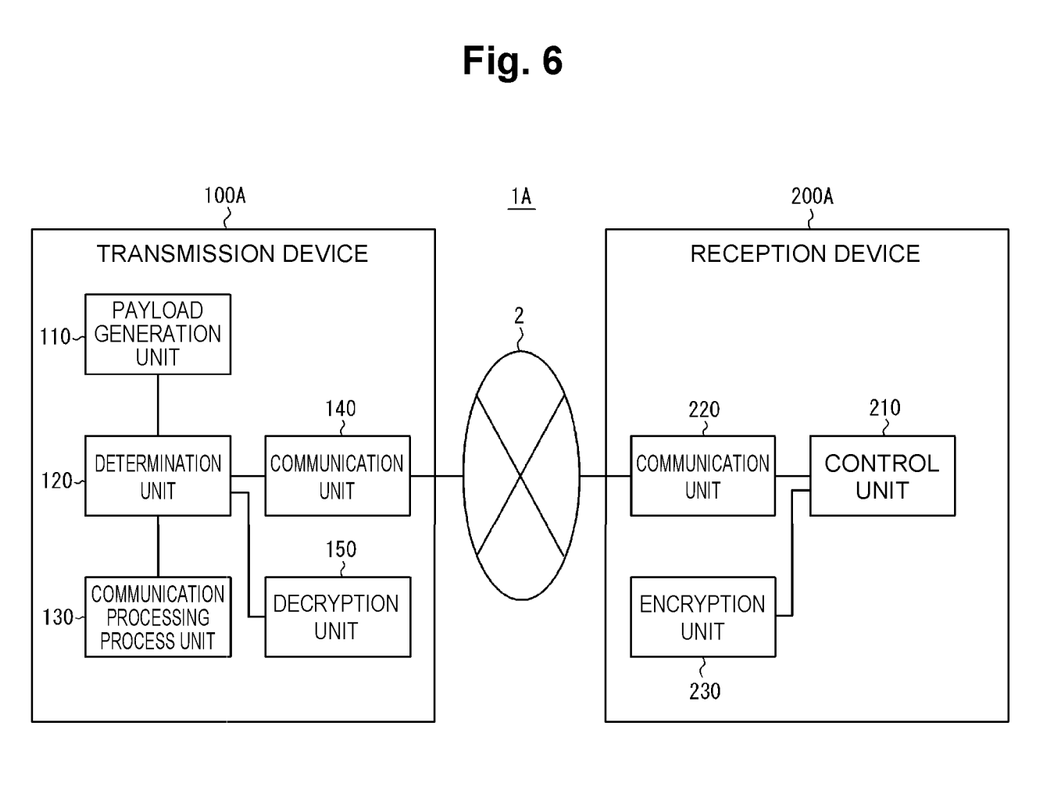
FIG. 6 is a block diagram showing an example of a configuration of a communication system according to a third embodiment of the present invention.

A communication system 1A according to a third embodiment will be described with reference to FIG. 6. FIG. 6 is a diagram showing an example of a configuration of the communication system 1A according to the third embodiment.

The communication system 1A according to the third embodiment is different from the communication system 1 according to the second embodiment in that the communication system 1A according to the third embodiment includes a decryption unit 150 in addition to the components of the transmission device 100 according to the second embodiment and includes an encryption unit 230 in addition to the components of the reception device 200 according to the second embodiment. Note that since the other components are the same as those of the communication system 1 according to the second embodiment, only differences will be given in the following description, and a repetitive description of commonalities will be omitted.

As shown in FIG. 6, the communication system 1A includes a transmission device 100A and a reception device 200A. The transmission device 100A includes a payload generation unit 110, a determination unit 120, a communication processing process unit 130, a communication unit 140, and the decryption unit 150. The reception device 200A includes a control unit 210, a communication unit 220, and the encryption unit 230. The transmission device 100A and the reception device 200A are connected to each other by a network 2.

The encryption unit 230 subjects control information (i=0 (passage) or i=1 (stoppage)) which is input from the control unit 210, and an ID (identification: identifier) and a PW (password) which are stored in a storage unit or the like to encryption processing and generates encrypted data. The control unit 210 outputs the encrypted data generated by the encryption unit 230 to the communication unit 220. The encrypted data output to the communication unit 220 is transmitted from the communication unit 220 to the transmission device 100A via the network 2. Note that the ID may be set in advance by a manager or the like. The PW may be set in advance by the manager or the like or may be generated using a publicly known PW automatic generation function.

An encryption processing scheme is not particularly limited. For example, a common key encryption scheme which uses the same key for encryption and decryption may be adopted or a public key encryption scheme which uses different keys for encryption and decryption may be adopted. Typical standards for common key encryption schemes include, for example, the DES (Data Encryption Standard) and the AES (Advanced Encryption Standard).

The communication unit 220 communicates with the communication unit 140 of the transmission device 100A via the network 2. The communication unit 220 transmits various types of information, such as encrypted data, to the communication unit 140 of the transmission device 100A via the network 2. The communication unit 220 receives various types of information, such as data after a communication processing process, from the communication unit 140 of the transmission device 100A via the network 2.

The communication unit 140 communicates with the communication unit 220 of the reception device 200A via the network 2. The communication unit 140 receives various types of information, such as encrypted data, from the communication unit 220 of the reception device 200A via the network 2. The communication unit 140 transmits various types of information, such as data after the communication processing process, to the communication unit 220 of the reception device 200A via the network 2.

The decryption unit 150 subjects encrypted data which is received by the communication unit 140 to decryption processing and acquires control information (i=0 (passage) or i=1 (stoppage)), an ID, and a PW which are decrypted. The decryption unit 150 outputs the decrypted control information (i=0 (passage) or i=1 (stoppage)), ID, and PW to the determination unit 120.

The determination unit 120 performs ID verification processing on the basis of the ID input from the decryption unit 150 and determines whether the ID is valid. If the determination unit 120 determines that the ID is valid, the determination unit 120 performs PW verification processing on the basis of the PW input from the decryption unit 150. On the other hand, if the determination unit 120 determines that the ID is invalid, the determination unit 120 does not perform the PW verification processing.

The determination unit 120 performs the PW verification processing on the basis of the PW input from the decryption unit 150 and determines whether the PW is valid. If the determination unit 120 determines that the PW is valid, the determination unit 120 determines whether to allow a payload to pass from a higher layer to a lower layer, on the basis of the control information input from the decryption unit

150. On the other hand, if the determination unit 120 determines that the PW is invalid, the determination unit 120 does not perform the determination processing.

The determination unit 120 determines whether to allow the payload to pass from the higher layer to the lower layer, on the basis of the control information input from the decryption unit 150. If the determination unit 120 determines to allow the payload to pass from the higher layer to the lower layer, on the basis of control information (i=0 (passage)) which is input from the decryption unit 150, the determination unit 120 allows the payload to pass from the higher layer to the lower layer. In this case, the communication processing process on the payload is executed at the lower layer. On the other hand, if the determination unit 120 determines not to allow the payload to pass from the higher layer to the lower layer, on the basis of control information (i=1 (stoppage)) which is input from the decryption unit 150, the determination unit 120 stops the payload at the higher layer. In this case, the communication processing process on the payload is not executed at the lower layer.

The communication system 1A according to the third embodiment makes it possible to arbitrarily control, by the reception device 200A, execution or stoppage of data transmission to the reception device 200A in the transmission device 100A based on the OSI reference model while enhancing security features using encryption and decryption processing. The communication system 1A according to the third embodiment also makes it possible to arbitrarily control, by the reception device 200A, execution or stoppage of communication between the transmission device 100A and the reception device 200A.

[Transmission Control Method]

Figure 7:
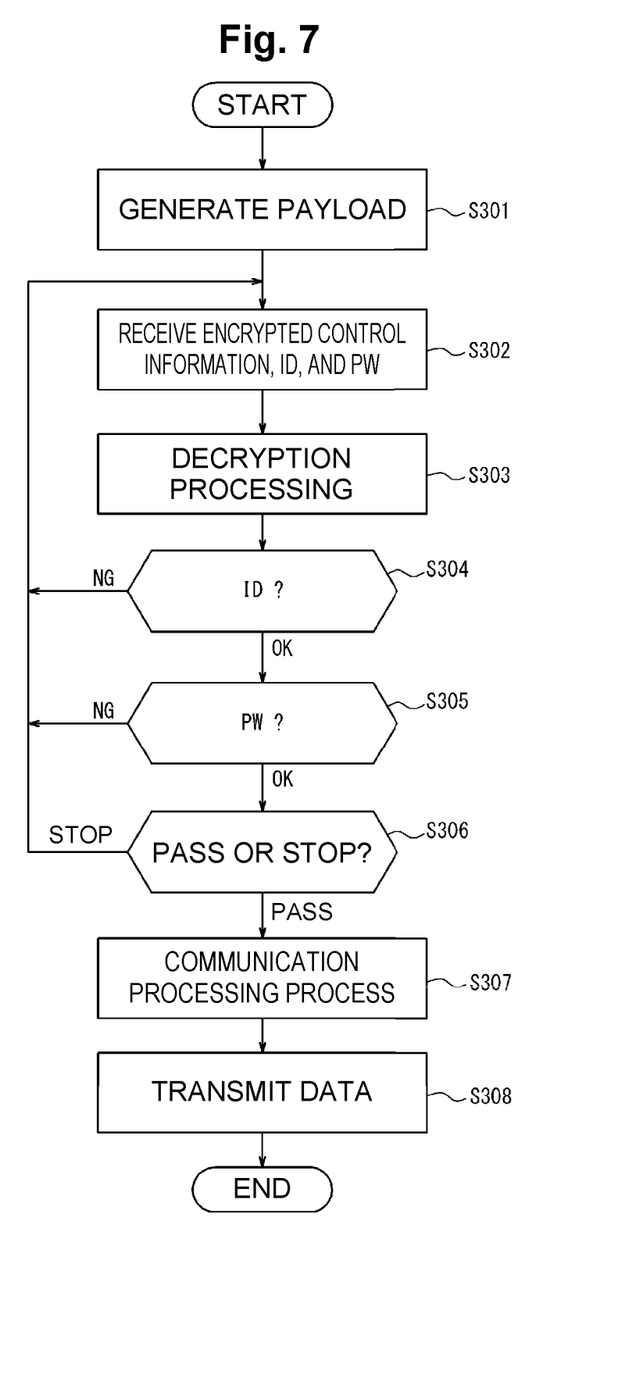
FIG. 7 is a flowchart showing an example of a transmission control method according to the third embodiment of the present invention.

A transmission control method according to the third embodiment will be described with reference to FIG. 7. FIG. 7 is a flowchart showing an example of the transmission control method.

In step S301, the transmission device 100A generates a payload which contains user data.

In step S302, the transmission device 100A receives control information (i=0 (passage) or i=1 (stoppage)), an ID, and a PW which are encrypted from the reception device 200A via the network 2.

In step S303, the transmission device 100A decrypts the encrypted control information (i=0 (passage) or i=1 (stoppage)), ID, and PW.

In step S304, the transmission device 100A verifies the decoded ID and determines whether the ID is valid. If the transmission device 100A determines that the ID is valid, a process in step S305 is performed. If the transmission device 100A determines that the ID is invalid, a process in step S302 is performed.

In step S305, the transmission device 100A verifies the decrypted PW and determines whether the PW is valid. If the transmission device 100A determines that the PW is valid, a process in step S306 is performed. If the transmission device 100A determines that the PW is invalid, the process in step S302 is performed.

In step S306, the transmission device 100A determines whether to allow a payload to pass from the higher layer to the lower layer, on the basis of the decrypted control information. If the transmission device 100A determines to allow the payload to pass from the higher layer to the lower layer, on the basis of control information indicating that i=0 (passage), a process in step S307 is performed. If the transmission device 100A determines not to allow the payload to pass from the higher layer to the lower layer, on the basis of control information indicating that i=1 (stoppage), the process in step S302 is performed.

In step S307, the transmission device 100A executes the communication processing process that adds headers and footers required for communication between the transmission device 100A and the reception device 200A to the payload.

In step S308, the transmission device 100A transmits data after the communication processing process to the reception device 200A via the network 2. Note that, if the transmission device 100A does not execute the communication processing process, the transmission device 100A and the reception device 200A stop communication.

The transmission control method according to the third embodiment makes it possible to arbitrarily control, by the reception device 200, execution or stoppage of data transmission to the reception device 200A in the transmission device 100A based on the OSI reference model while enhancing security features using encryption and decryption processing. The transmission control method according to the third embodiment also makes it possible to arbitrarily control, by the reception device 200A, execution or stoppage of communication between the transmission device 100A and the reception device 200A.

Application of the transmission control method according to the third embodiment to, for example, an IoT device infected with malware, an IoT device physically taken over by a malicious third party, and an IoT device missing due to a disaster or the like allows a manager of the reception device 200A to solve a conventional problem and further enhance security features. The conventional problem is that, if the reception device 200A receives unnecessary data, the unnecessary data needs to be automatically or manually discarded.

Also, application of the transmission control method according to the third embodiment to an IoT device infected with malware and an IoT device physically taken over by a malicious third party allows the manager of the reception device 200A to solve a conventional problem and further enhance the security features. The conventional problem is that, if the reception device 200A receives unnecessary data, the manager of the reception device 200A needs to visit a site where such devices are installed and forcibly stop communication of the devices or eliminate the devices.

Additionally, application of the transmission control method according to the third embodiment to an IoT device missing due to a disaster or the like allows the manager of the reception device 200A to solve a conventional problem and further enhance the security features. The conventional problem is that, if the reception device 200A receives unnecessary data, the manager of the reception device 200A needs to identify and eliminate such devices.

<Modification>

The present invention is not limited to the above-described embodiments and modifications. For example, the various types of processes described above are not limited to execution in chronological order in the described manner, and may be executed in parallel or individually in accordance with processing capacity of a device which is to execute the processes or as needed. Additionally, appropriate changes can be made without departing from the spirit of the present invention.

<Program and Recording Medium>

Various type of processing functions in each of the devices described in the above-described embodiments and modifications may be implemented by a computer. In this case, processing details of functions which each device needs to have are described by a program. Execution of the program by the computer implements the various types of processing functions in each of the devices on the computer.

A program describing such processing details can be recorded on a computer-readable recording medium. The computer-readable recording medium may be anything, such as a magnetic recording device, an optical disc, a magneto-optical recording medium, or a semiconductor memory.

Circulation of such a program is performed by, for example, selling, giving, or renting a portable recording medium, such as a DVD or a CD-ROM, having the program recorded thereon. Additionally, the program may be circulated by storing the program in a storage device of a server computer and transferring the program from the server computer to another computer via a network.

A computer which executes such a program temporarily stores, in a storage unit thereof, a program which is recorded on a portable recording medium or a program which is transferred from a server computer. At the time of execution of processing, the computer reads the program stored in its storage unit and executes processing in accordance with the read program. As another execution form of such a program, the computer may read a program directly from a portable recording medium and execute processing in accordance with the program. Additionally, each time a program is transferred from the server computer to the computer, the computer may sequentially execute processing in accordance with the received program. The above-described processing may be executed by a so-called ASP (Application Service Provider) type service which does not transfer a program from the server computer to the computer and implements processing functions only by giving instructions to execute the program and acquiring a result. Note that a program includes information provided to be used for processing by an electronic computer which is equivalent to a program (e.g., data which is not a direct instruction to a computer but has a property of specifying processing of the computer).

Although each device is configured by executing a predetermined program on a computer, at least a part of processing details of the program may be implemented by hardware.

Although the embodiments have been described as typical examples, it will be apparent to those skilled in the art that many changes and replacements can be made within the spirit and scope of the present invention. Thus, the present invention should not be interpreted as being limited by the embodiments, and various modifications and changes can be made without departing from the scope of the claims. For example, it is possible to combine a plurality of constituent blocks described in the configuration diagrams of the embodiments into one or divide one constituent block.

REFERENCE SIGNS LIST 1, 1A Communication system
2 Network
100, 100A Transmission device
110 Payload generation unit
120 Determination unit
130 Communication processing process unit
140 Communication unit
150 Decryption unit
200, 200A Reception device
210 Control unit
220 Communication unit
230 Encryption unit

The invention claimed is:

1. A transmission control method for a transmission device based on a layered communication function model, the method comprising:
   generating a payload at a higher layer of the layered communication function model, wherein the payload comprises user data;
   determining whether to allow the payload to pass from the higher layer to a lower layer on the basis of control information;
   executing a communication processing process on the payload at the lower layer of the layered communication function model based on the determination to allow the payload to pass from the higher layer to the lower layer; and
   wherein, when it is determined to not allow the payload to pass, stopping the payload at the higher level; and
   stopping the communication processing process on the payload at the lower layer.

2. The transmission control method according to claim 1, further comprising:
   receiving the control information from a reception device based on the layered communication function model, wherein the layered communication function model includes an Open System Interconnection reference model;
   transmitting data after the communication processing process to the reception device when the communication processing process on the payload is executed at the lower layer; and
   stopping communication between the transmission device and the reception device when the communication processing process on the payload is stopped at the lower layer.

3. The transmission control method according to claim 1, further comprising:
   receiving control information, an identifier, and a password which are encrypted from the reception device based on the layered communication function model, wherein the layered communication function model includes an Open System Interconnection reference model;
   decrypting the encrypted control information, the identifier, and the password;
   determining whether the decrypted identifier and the decrypted password are valid; and
   executing the communication processing process on the payload based on the determining whether the decrypted identifier and the decrypted password are valid.

4. A computer-readable non-transitory recording medium storing computer-executable program instructions that when executed by a processor cause a computer system to execute a transmission control method comprising:
   generating a payload at a higher layer of the layered communication function model, wherein the payload comprises user data;
   determining whether to allow the payload to pass from the higher layer to a lower layer, on the basis of control information;
   executing a communication processing process on the payload at the lower layer of the layered communication function model based on the determination to allow the payload to pass from the higher layer to the lower layer; and wherein, when it is determined to not allow the payload to pass, stopping the payload at the higher level; and
stopping the communication processing process on the payload at the lower layer.

5. A system for controlling transmission based on a layered communication function model, the system comprises:
a processor; and
a memory storing a computer-executable program instructions that when executed by the processor cause the system to execute a method comprising:
generating a payload at a higher layer of the layered communication function model, wherein the payload comprises user data;
determining whether to allow the payload to pass from the higher layer to a lower layer, on the basis of control information;
executing a communication processing process on the payload at the lower layer of the layered communication function model, based on the determination to allow the payload to pass from the higher layer to the lower layer; and
wherein, when it is determined to not allow the payload to pass, stopping the payload at the higher level; and
stopping the communication processing process on the payload at the lower layer.

6. The transmission control method according to claim 1, further comprising:
receiving the control information from a reception device based on the layered communication function model, wherein the layered communication function model includes an Open System Interconnection reference model;
when the communication processing process on the payload is executed at the lower layer, transmitting data after the communication processing process to the reception device; and
when the communication processing process on the payload is stopped at the lower layer, stopping communication between the transmission device and the reception device.

7. The transmission control method according to claim 1, further comprising:
receiving control information, an identifier, and a password which are encrypted from the reception device based on the layered communication function model, wherein the layered communication function model includes an Open System Interconnection reference model;
decrypting the encrypted control information, the identifier, and the password; and
determining whether the decrypted identifier and the decrypted password are valid;
executing the communication processing process on the payload based on the determining whether the decrypted identifier and the decrypted password are valid.

8. The transmission control method according to claim 2, further comprising:
receiving control information, an identifier, and a password which are encrypted from the reception device based on the layered communication function model;
decrypting the encrypted control information, the identifier, and the password; and
determining whether the decrypted identifier and the decrypted password are valid;
executing the communication processing process on the payload based on the determining whether the decrypted identifier and the decrypted password are valid.

9. The computer-readable non-transitory recording medium according to claim 4, the computer-executable program instructions when executed further causing the system to execute a method comprising:
receiving the control information from a reception device based on the layered communication function model, wherein the layered communication function model includes an Open System Interconnection reference model;
when the communication processing process on the payload is executed at the lower layer, transmitting data after the communication processing process to the reception device; and
stopping communication between the transmission device and the reception device when the communication processing process on the payload is stopped at the lower layer.

10. The computer-readable non-transitory recording medium according to claim 4, the computer-executable program instructions when executed further causing the system to execute a method comprising:
receiving control information, an identifier, and a password which are encrypted from the reception device based on the layered communication function model, wherein the layered communication function model includes an Open System Interconnection reference model;
decrypting the encrypted control information, the identifier, and the password;
determining whether the decrypted identifier and the decrypted password are valid; and
executing the communication processing process on the payload based on the determining whether the decrypted identifier and the decrypted password are valid.

11. The system according to claim 5, the computer-executable program instructions when executed further causing the system to execute a method comprising:
receiving the control information from a reception device based on the layered communication function model, wherein the layered communication function model includes an Open System Interconnection reference model;
when the communication processing process on the payload is executed at the lower layer, transmitting data after the communication processing process to the reception device; and
stopping communication between the transmission device and the reception device when the communication processing process on the payload is stopped at the lower layer.

12. The system according to claim 5, the computer-executable program instructions when executed further causing the system to execute a method comprising:
receiving control information, an identifier, and a password which are encrypted from the reception device based on the layered communication function model, wherein the layered communication function model includes an Open System Interconnection reference model;
decrypting the encrypted control information, the identifier, and the password;

determining whether the decrypted identifier and the decrypted password are valid; and executing the communication processing process on the payload based on the determining whether the decrypted identifier and the decrypted password are valid.

13. The computer-readable non-transitory recording medium according to claim 4, the computer-executable program instructions when executed further causing the system to execute a method comprising:

receiving the control information from a reception device based on the layered communication function model, wherein the layered communication function model includes an Open System Interconnection reference model;

when the communication processing process on the payload is executed at the lower layer, transmitting data after the communication processing process to the reception device; and when the communication processing process on the payload is stopped at the lower layer, stopping communication between the transmission device and the reception device.

14. The computer-readable non-transitory recording medium according to claim 4, the computer-executable program instructions when executed further causing the system to execute a method comprising:

receiving control information, an identifier, and a password which are encrypted from the reception device based on the layered communication function model, wherein the layered communication function model includes an Open System Interconnection reference model;

decrypting the encrypted control information, the identifier, and the password;

determining whether the decrypted identifier and the decrypted password are valid; and executing the communication processing process on the payload based on the determining whether the decrypted identifier and the decrypted password are valid.

15. The computer-readable non-transitory recording medium according to claim 9, the computer-executable program instructions when executed further causing the system to execute a method comprising:

receiving the control information from a reception device based on the layered communication function model;

when the communication processing process on the payload is executed at the lower layer, transmitting data after the communication processing process to the reception device; and stopping communication between the transmission device and the reception device when the communication processing process on the payload is stopped at the lower layer.

16. The system according to claim 5, the computer-executable program instructions when executed further causing the system to execute a method comprising:

receiving the control information from a reception device based on the layered communication function model, wherein the layered communication function model includes an Open System Interconnection reference model;

when the communication processing process on the payload is executed at the lower layer, transmitting data after the communication processing process to the reception device; and when the communication processing process on the payload is stopped at the lower layer, stopping communication between the transmission device and the reception device.

17. The system according to claim 5, the computer-executable program instructions when executed further causing the system to execute a method comprising:

receiving control information, an identifier, and a password which are encrypted from the reception device based on the layered communication function model, wherein the layered communication function model includes an Open System Interconnection reference model;

decrypting the encrypted control information, the identifier, and the password;

determining whether the decrypted identifier and the decrypted password are valid; and executing the communication processing process on the payload based on the determining whether the decrypted identifier and the decrypted password are valid.

* * * * *